Figure 4:
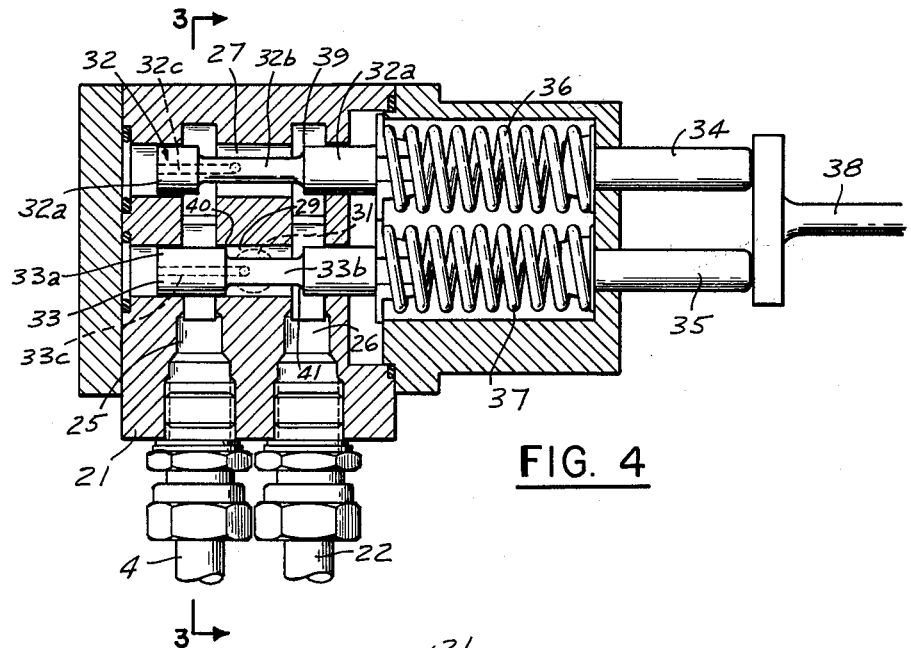

Oct. 8, 1963    PER OLLE LENNART GUSTAFSSON    3,106,066
CONTROL DEVICE FOR HYDRAULIC SYSTEM
Filed Nov. 29, 1961                             2 Sheets-Sheet 1
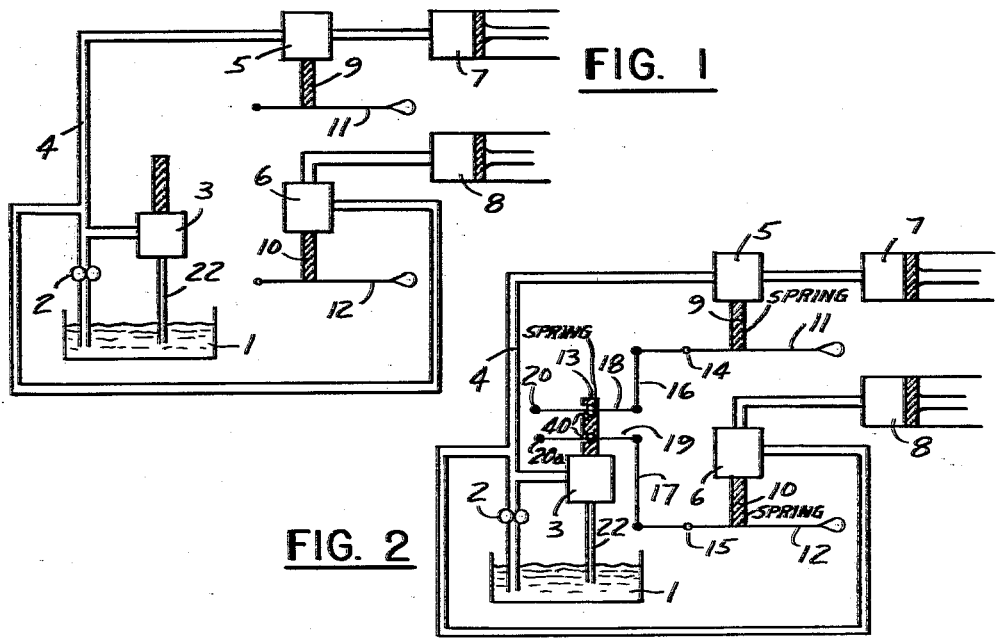
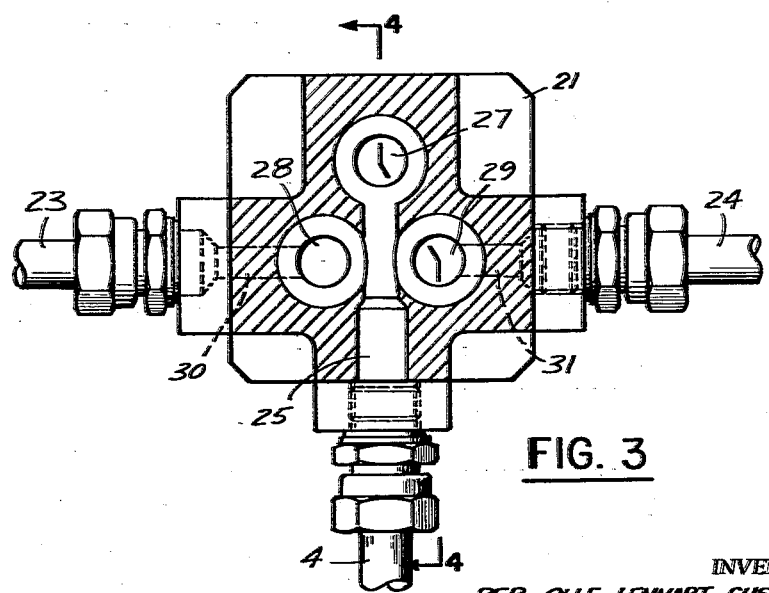
FIG. 3
INVENTOR.
PER OLLE LENNART GUSTAFSSON
BY
ATTORNEYS INVENTOR.
PER OLLE LENNART GUSTAFSSON
BY Hanes and Nydick
ATTORNEYS

United States Patent Office 3,106,066
Patented Oct. 8, 1963

3,106,066
CONTROL DEVICE FOR HYDRAULIC SYSTEM
Per Olle Lennart Gustafsson, Karlskoga, Sweden, assignor to Aktiebolaget Bofors, Bofors, Sweden, a Swedish corporation
Filed Nov. 29, 1961, Ser. No. 155,713
1 Claim. (Cl. 60—52)

The present invention relates to a control device for a hydraulic system of the kind including a pump for delivering a flow of pressure fluid at a constant rate of flow irrespective of the counterpressure acting upon the output of the pump, one or several hydraulic motors connected to the ouput of the pump, an adjustable pressure reduction valve included in the connection between the pump and each motor for reducing the pressure in the connection and an adjustable relief valve also connected to said connection for limiting the fluid pressure therein to a maximum pressure.

FIG. 1 of the accompanying drawing shows schematically a conventional hydraulic system of the general type above referred to. According to FIG. 1, the system comprises a storage tank 1 for the pressure fluid such as oil, a suitable pump 2 such as a gear pump, a relief valve 3 which feeds oil back into the tank through a pipe 22 and may be controlled by a spring, and a pipe 4 through which oil under pressure is fed to hydraulic motors 7 and 8. The connection between the pump and the motors includes pressure reduction valves 5 and 6 which serve to reduce the pressure of the oil fed to the motors to a suitable value. The relief valve constitutes a safety valve which returns oil into tank 1 when the pressure in pipe 4 exceeds the permissible maximum pressure. The reduction valves 5 and 6 are controlled by suitable spring means 9 and 10 respectively and control the pressure of the oil delivered to the motors so that the pressure is always proportional to the load for which spring means 9 and 10 are set. The setting of springs 9 and 10 may be adjusted by control levers 11 and 12 in a manner which is readily apparent.

In order to assure that there is always an adequate working pressure available at motors 7 and 8, the oil pressure in pipe 4 must be constantly held somewhat greater than the maximum pressure for which the reduction valves 5 and 6 may be set. In actual practice the hydraulic motors in such a system are set for a comparatively low pressure and work with the maximum pressure only for short periods of time. As a result the relief valve feeds oil back into the storage tank during most of the time the system is operated and such a feed-back of oil represents a loss of energy which is at a maximum when the pressure required in the hydraulic motors is at a minimum. The energy loss manifests itself in the form of an elevation of the temperature of the pressure fluid and such elevation in temperature may make it necessary to include a cooling system in the installation.

It is the broad object of the present invention to provide in a hydraulic system of the general kind above referred to, a control device by means of which the afore-explained energy loss is eliminated, completely or at least to a very substantial part.

In accordance with the invention the aforementioned object and other objects of the invention which will be brought out hereinafter are attained by controlling the relief valve and the reduction valves of the system by control means which always and automatically set the relief valve for a pressure that is somewhat higher than the highest working pressure for which the reduction valves are set.

In the accompanying drawing a preferred embodiment of the invention is shown by way of illustration and not by way of limitation.

In the drawing:
FIG. 2 is a diagrammatic view of a hydraulic system including a control device according to the invention.
FIG. 3 is a sectional structural view of the control device taken on line III—III of FIG. 4.
FIG. 4 is a section taken on line IV—IV of FIG. 3, and
FIG. 5 is a perspective view of the control device according to FIGS. 3 and 4.

Referring first to FIG. 2 in detail, the hydraulic system according to this figure is the same as that according to FIG. 1, except that the setting of the relief valve 3 is first automatically and continuously correlated with the setting of reduction valve 5 or 6. For this purpose the relief valve is provided with an adjustable compression spring 13 and the aforementioned control levers 11 and 12 for the reduction valves are extended beyond their fixed pivotal points 14 and 15 and the extended parts of the levers are hinged to links 16 and 17 respectively which, in turn, are hinged to links 18 and 19 respectively. The links 18 and 19 are pivotal about pivots 20 and 20a respectively and each of the links is coupled with the compression spring 13 so that it can vary the load of the spring within certain limits without affecting the setting of the other link. This is schematically indicated in FIG. 2 by elongated slots 40 through which links 18 and 19 respectively are extended.

As is evident, a pivoting of either lever 11 or lever 12 in counterclockwise direction will effect an increase in the compression of spring 9 or 10 and also of spring 13. As is also evident, actuation of one lever, say lever 11, will not affect the setting of lever 12 and link 19. In other words, the setting of one reduction valve for a higher pressure will not change the setting of the other reduction valve for a lower pressure.

Figure 5:
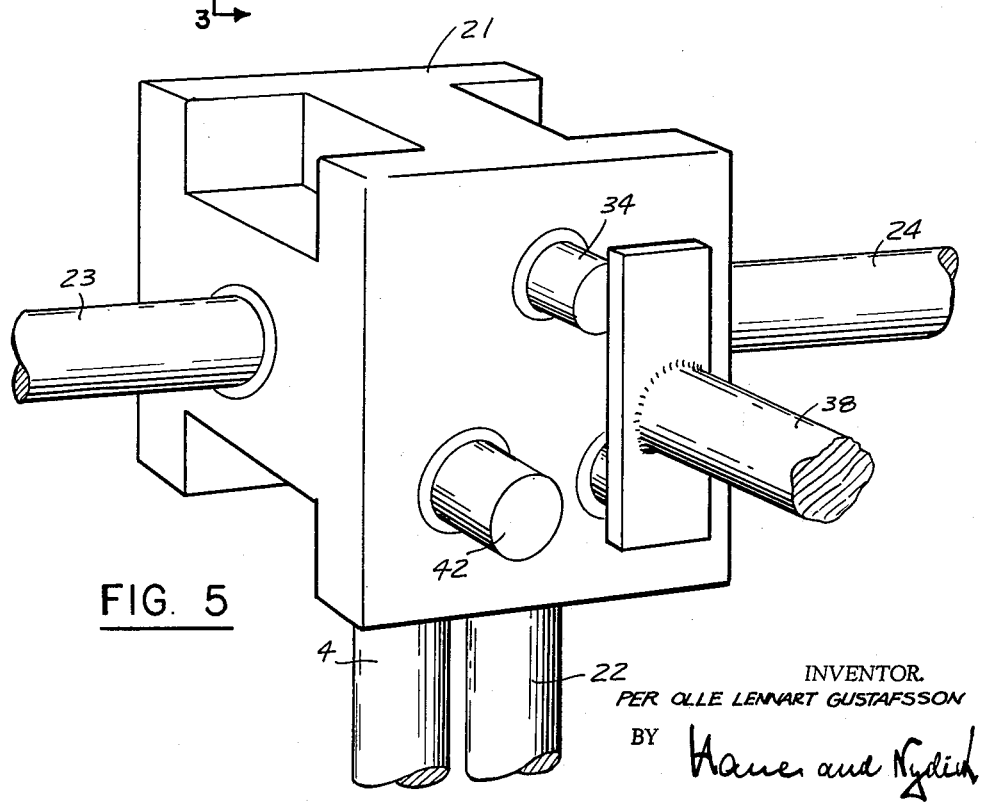

Turning now to FIGS. 3, 4 and 5, the control device according to these figures comprises a common housing or valve body 21 in which are accommodated the relief valve and the two reduction valves. The pressure pipe and the pressure fluid return pipe are designated in FIGS. 2 through 5 by the same numerals. Pipes 23 and 24 shown in FIG. 3 should be visualized as being connected to motors 7 and 8 respectively.

Housing body 21 includes two perpendicularly shown ducts or bores 25 and 26 and three horizontally shown ducts or bores 27, 28 and 29. The bores 28 and 29 are connected by ducts or bores 30 and 31 with pipes 23 and 24. In this connection it may be pointed out that in FIG. 3 the uppermost circle represents the relief valve and the lower circles represent the two reduction valves. A plunger 32 is slidable in bore 27 and a plunger 33 is slidable in bore 29. A similar plunger should be visualized as being slidable in bore 28. Each of the valve plungers comprises two cylindrical portions 32a and 33a respectively, the outer diameter of which just fits the inner diameter of bores 27 and 29 respectively and set-off joining portions 32b and 33b respectively. Each plunger is formed in its periphery with a channel 32c and 33c respectively which leads from the reduced joining portion of the plunger to the lefthand end surface thereof.

The plungers may be urged towards the left by means of push rods 34 and 35 which act upon springs 36 and 37. The push rods in turn may be moved towards the left through equal distances by means of a common control member 38 which should be visualized as being controlled in any suitable manner. In this connection it may be mentioned that there is shown in FIG. 4 the control of the relief valve and one of the reduction valves only. The control of the second reduction valve should be visualized as being effected in the same manner.

As has been previously explained, the concept of the invention requires that the relief valve is set for a pressure that is somewhat higher than the pressure for which the reduction valves are set. This is effected in FIG. 4 by showing spring 36 somewhat heavier than spring 37. The same effect can be obtained by using springs of equal strength and fitting a spring washer in the holder for spring 36. It is also possible to effect a differential in the setting by springs of equal strength but plungers of different diameters. Which one of the aforementioned possibilities of obtaining the same result is adopted is not a matter of principle but of convenience of manufacture.

The control device as hereinbefore described functions as follows:

In the position shown in FIG. 4 oil can freely pass through bores 25, 27 and 26 to be returned into the storage tank 1 by pipe 22. As is apparent, the flow of oil through the device is very little restricted so that no substantial oil pressure will be built up in the system.

When now the control member 38 is moved towards the left the plungers 32 and 33 will also be moved towards the left as a result of the increase of the load at springs 36 and 37. Due to the displacement of the plungers toward the left, shoulder 39 of plunger 32 will move closer to the respective peripheral edge of housing 21 thereby correspondingly constricting the flow of oil from bore 27 into bore 26. As a result, the pressure in bore 27 will correspondingly rise and such increase in pressure will force oil through channel 32c into the portion of 27 closed off by the respective plunger portion 32a. This increase of pressure urges plunger 32 towards the right and into a position in which the oil pressure and the pressure exerted by spring 36 upon the plunger are in balance. The pressure in pipe 4 and bores 25 and 27 will generally be proportional to the distance by which push rod 34 has been moved towards the left.

Plunger 33 has two shoulders 40 and 41 which are longitudinally spaced so that in the illustrated position shoulder 40 closes the connection between bore 25 and bore 29 and opens the connection between bore 29 and bore 26. When now plunger 33 is moved towards the left as previously described, shoulder 40 will open the connection between bore 25 and bore 29 and shoulder 41 will close the connection between bore 29 and bore 26. As a result the pressure in bore 29 rises and causes a flow of oil through channel 33c. The increase in pressure in the portion of bore 29 closed by the left-hand plunger portion 33a urges plunger 33 towards the right until the plunger occupies a position in which the oil pressure and the pressure of spring 37 are in balance.

As is now evident, a displacement of control member 38 effects a simultaneous change in the setting of the relief valve and the respective reduction valve, though for different pressures due to the difference in the strength of springs 36 and 37.

Turning now to FIG. 5, this figure shows that control member 38 occupies only about half of the face of push-rod 34. This permits the use of a second control member 38 for simultaneous control of the relief valve and the second reduction valve. FIG. 5 shows a push-rod 42, corresponding in function to push-rod 35, for control of the second reduction valve.

While the invention has been described in detail with respect to a certain now preferred example and embodiment of the invention, it will be understood by those skilled in the art, after understanding the invention, that various changes and modifications may be made without departing from the spirit and scope of the invention, and it is intended therefore to cover all such changes and modifications in the appended claim.

What is claimed as new and desired to be secured by Letters Patent is:

A control device for a hydraulic system including a pump for pumping pressure fluid at a constant rate of flow, a hydraulic motor connected to the output of said pump, an adjustable pressure reduction valve included in the connection between the pump and the motor for reducing the pressure in said connection and an adjustable relief valve also connected to said connection for limiting the fluid pressure therein to a maximum pressure, said control device comprising common control means for said reduction valve and said relief valve to vary the fluid pressure control effected by said valves, said control means including first transmission means connected to the relief valve and second transmission means connected to the reduction valve, the ratio of transmission of said transmission means being such that the relief valve is set for a higher pressure than the reduction valve in response to any given setting of the control means, each of said transmission means including a cylindrical duct, a plunger slidable in said duct, a spring means acting on one side of the plunger to urge the same in one direction, a duct feeding pressure fluid into the duct portion on the other side of the plunger to urge the same in the opposite direction, the cylindrical duct of the first transmission means communicating with the relief valve and the cylindrical duct of the second transmission means communicating with the reduction valve, the position of the plungers in the ducts controlling the fluid pressure at the relief valve and the reduction valve respectively and being controlled by the spring pressure exerted on said one side of the plunger, the spring pressure exerted upon the plunger associated with the first transmission means being stronger than the pressure exerted upon the plunger associated with the second transmission means in response to the setting of the control means.

References Cited in the file of this patent
UNITED STATES PATENTS

| | | |
|---|---|---|
| 2,306,346 | Rockwell | Dec. 22, 1942 |
| 2,438,389 | Edge | Mar. 23, 1948 |
| 2,725,890 | Kanuch | Dec. 6, 1955 |
| 2,815,703 | Talak | Dec. 10, 1957 |